J. R. WERTH.
APPARATUS FOR PRESERVING BY VACUUM.
APPLICATION FILED SEPT. 6, 1912.
1,145,395.
Patented July 6, 1915.
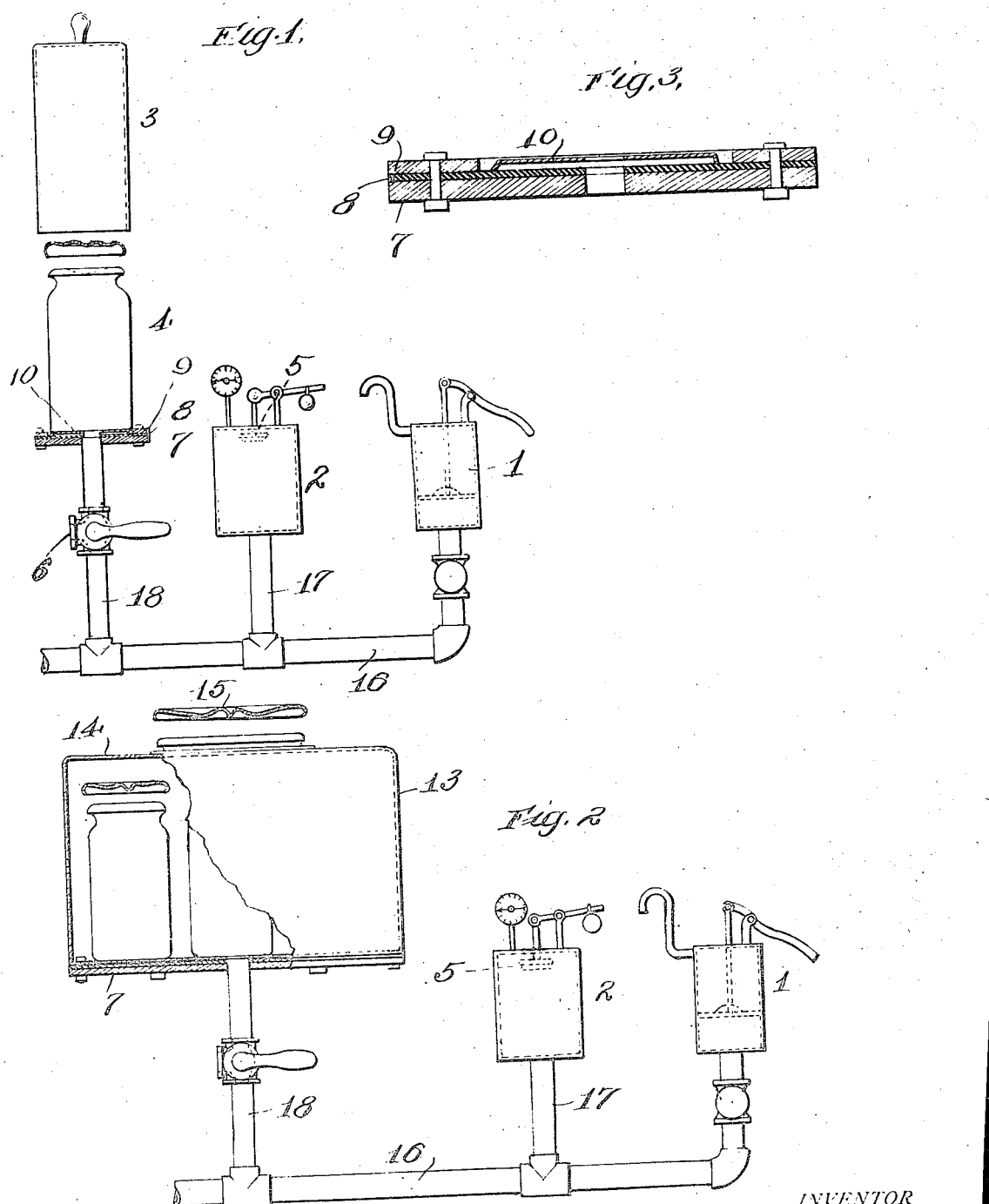

UNITED STATES PATENT OFFICE.

JAMES R. WERTH, OF RICHMOND, VIRGINIA.

APPARATUS FOR PRESERVING BY VACUUM.

1,145,395.

Specification of Letters Patent.     Patented July 6, 1915.

Application filed September 6, 1912. Serial No. 718,909.

*To all whom it may concern:*

Be it known that I, JAMES R. WERTH, a citizen of the United States, residing at Richmond, in the county of Henrico and State of Virginia, have invented certain new and useful Improvements in Apparatus for Preserving by Vacuum, of which the following is a specification.

In the drawings—Figure 1 is a front elevation of my improved apparatus; Fig. 2 is a similar view of a slightly modified embodiment; Fig. 3 is an enlarged sectional view of the table and its resilient packing.

My invention relates to improved means for preserving food and other substances after being properly prepared.

The process carried out by the use of my improved apparatus is an improvement on those generally adopted by the farmer's wife, where the food is cooked in containers having safety valve covers, partially immersed in boiling water in ordinary clothes boilers and where the contents are cooked for one to one and a half hours for three consecutive days, as fully described in Farmers' Bulletin No. 359, U. S. Agricultural Department, Washington, D. C., while in the intervening periods of cooling, vacuums are formed and air is drawn from the substance in the container and by the final boiling and condensation of steam, a rarefying of the remaining air is accomplished, and the food indefinitely preserved—a safe process but tedious.

The improvements offered by my invention are obviously simpler, safer, less laborious and more economical in fuel.

The process carried out with my apparatus advocates one cooking, and the removal of air from the containers and their contents, after cooling, by pumping, also the automatic sealing of the container *in vacuo*. This is an advance on expelling air by heat and securing a vacuum by the condensation of steam. In this process the lowest heat necessary to devitalize germs and to break down the air cells in the food within the shortest period is employed, thus minimizing the risk of over cooking, and of losing the volatile oils which furnish the flavors.

The invention is useful, the cost of the apparatus is moderate, and the operation simple. It can be used in the home and in the country canning clubs, the food being prepared at home on the kitchen stove and when cooled taken to the club house and finished. It also can be used to preserve sterilized fruit juices, the aromas of coffee, tobacco, flavoring extracts, spices, condiments and pasteurized milk.

In order to make effective this process, I have invented an apparatus shown in the drawings.

The reference numeral 1 designates a pump, 2 a vacuum regulator, 3 a vacuum chamber and 4 a container. The air pump 1 shown is an ordinary well pump capable of lifting water twenty-six feet, but I do not limit my claim to this, as any approved pump may be used. In this process any kind of pump and any power may be used. The tension regulator 2 is provided with a relief valve 5 which can be set to admit air when the tension exceeds that which is found to be desirable in the treatment of different substances.

6 is a three-way cock for controlling the movement of air into and out of vacuum chamber 3.

7 is a plate on which is fastened the gum seat 8.

9 is a clamp to hold the gum seat in place, and 10 is a stool on which the container rests, permitting easy egress and ingress of air into and out of the chamber 3 under and around the container 4.

13 is a vacuum chamber into which many containers may be placed for treatment at one time without limit as to capacity. The top cover 14 of the vacuum chamber 13 may be of any approved construction.

15 is a cap or closure for the top of the chamber which may be of any approved construction.

The apparatus may be readily cleaned and sterilized by filling the air pipes with scalding water and a germicide and pumping out the same.

As will be seen from the drawings, the pump 1 is connected to a pipe 16 from which are branches 17 and 18; the branch 18 being connected with the vacuum chamber and provided with a three-way cock, while the branch 17 is connected to the tension regulator 2.

I do not claim the improved container in this application, as the essential features thereof are made the subject matter of claims in another case.

I claim:

An apparatus for sealing receptacles by vacuum, having a fixed flat bottom and a removable hood, together forming a vacuum chamber, said bottom comprising a solid base, a packing conforming in shape to said base and a retaining member for holding said packing to the base, said retaining member engaging with the edge of said hood to guide it transversely when the hood stands in position on said packing; a raised flat stool forming a receptacle seat within said retaining member; said base, packing and stool being provided with perforations; and means for withdrawing air from said vacuum chamber through said perforations.

The foregoing specification signed at Washington D. C. this 6 day of September 1912.

JAMES R. WERTH.

In presence of two witnesses:
 HERVEY S. KNIGHT,
 EDWIN S. CLARKSON.